Oct. 2, 1962 E. E. MATHESON ETAL 3,056,573
FLUID PRESSURE ACTUATED VALVE
Filed July 12, 1956 5 Sheets-Sheet 1
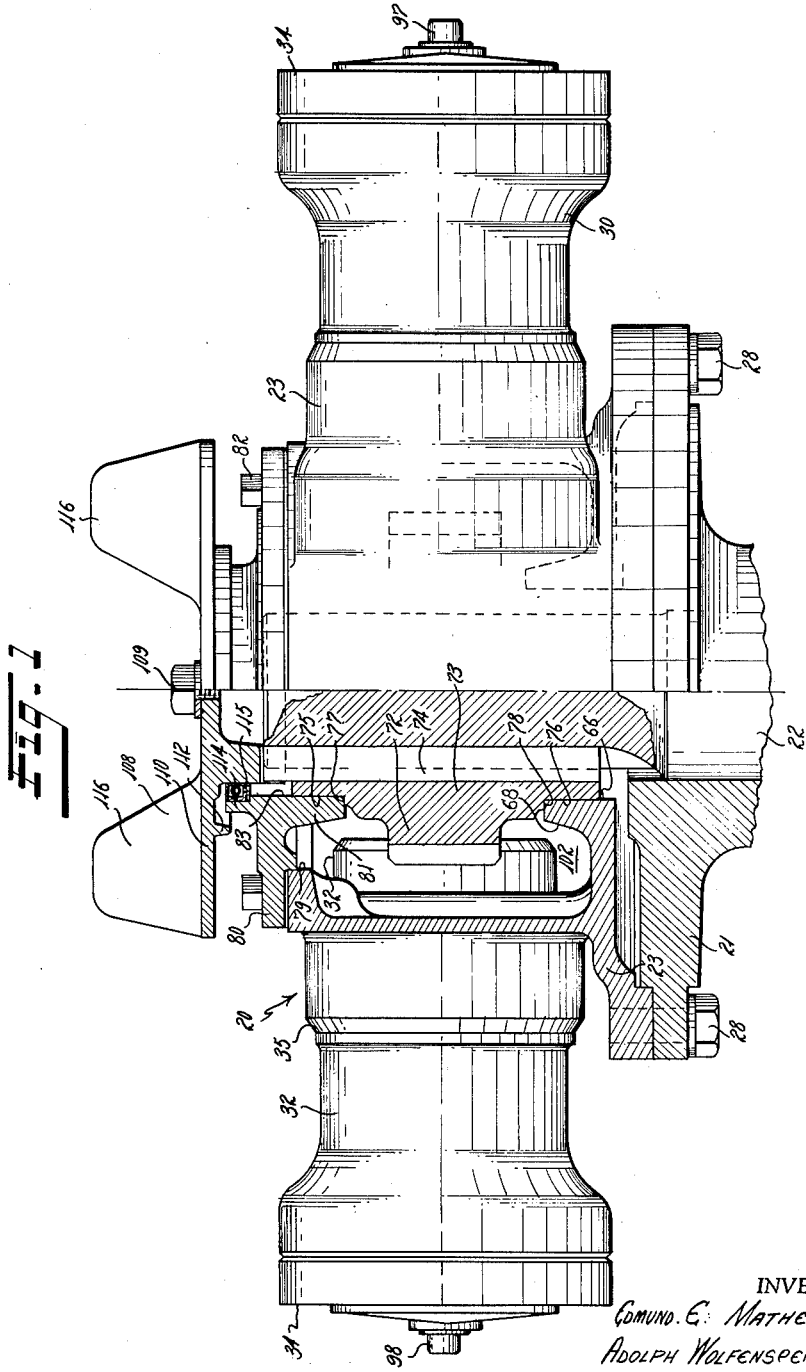
INVENTORS
Edmund E. Matheson
Adolph Wolfensperger
BY Strauch, Nolan & Diggins
ATTORNEYS

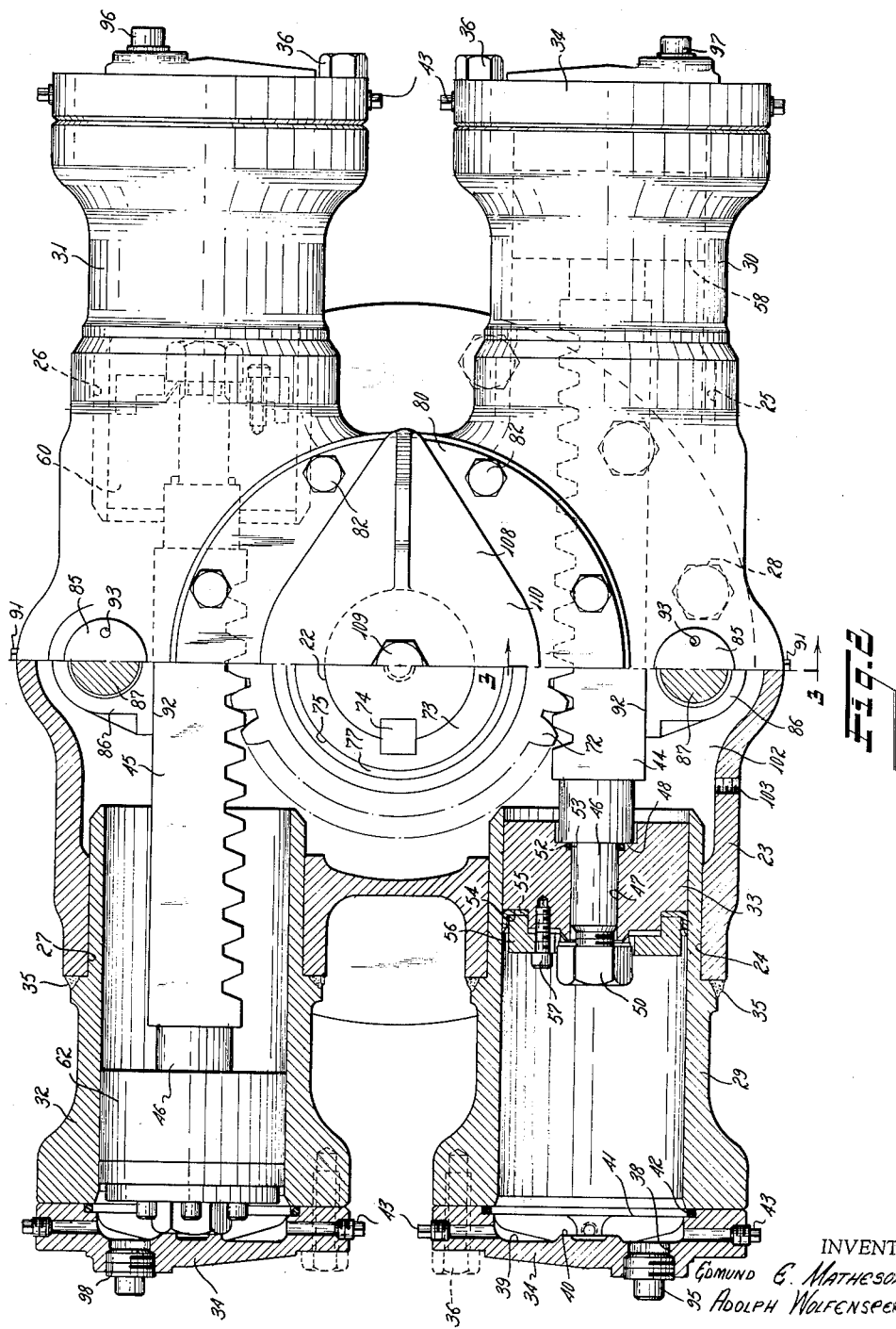

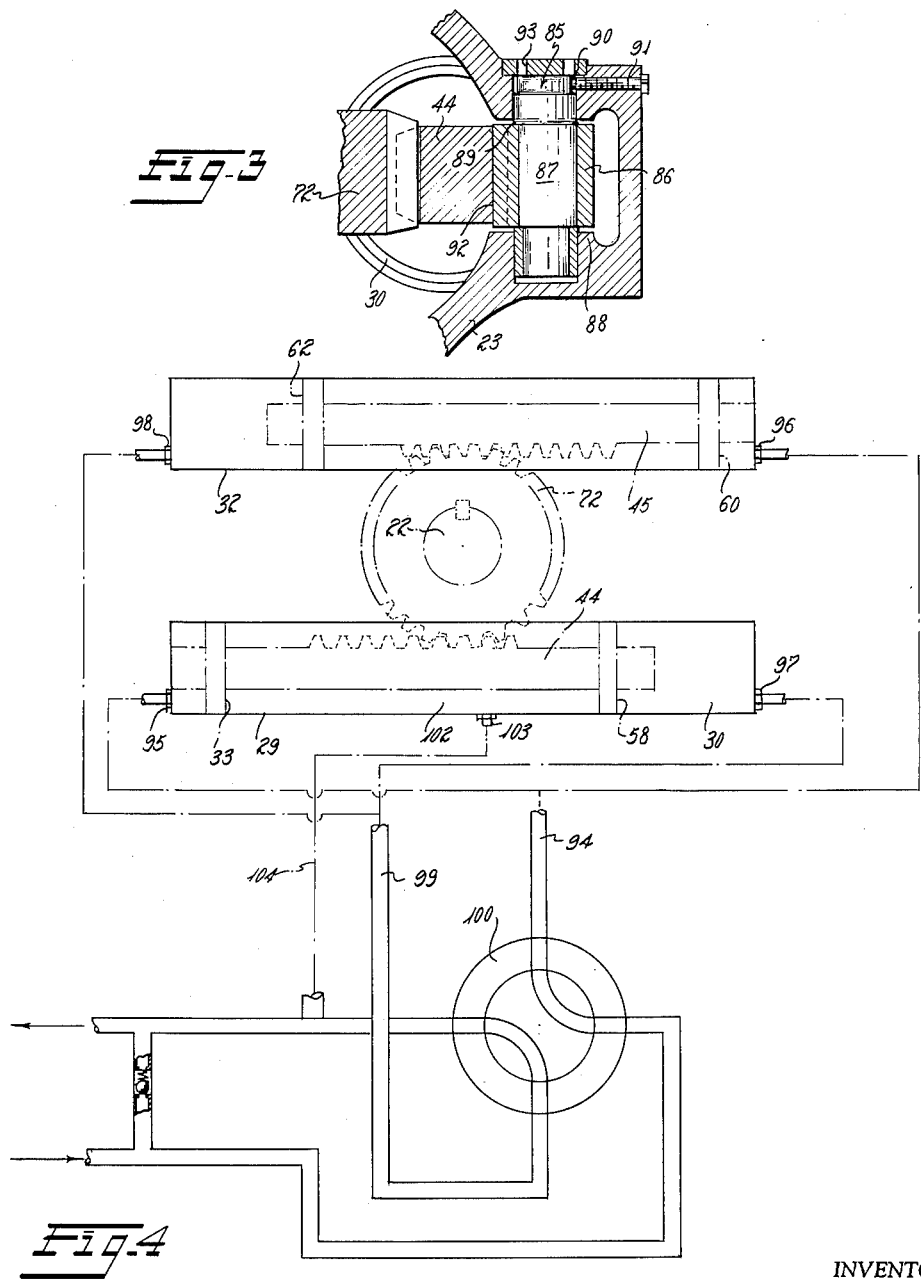

Oct. 2, 1962 E. E. MATHESON ETAL 3,056,573
FLUID PRESSURE ACTUATED VALVE
Filed July 12, 1956 5 Sheets-Sheet 4
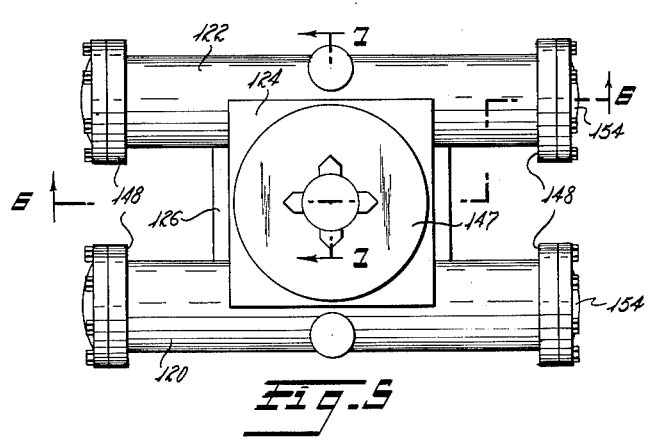
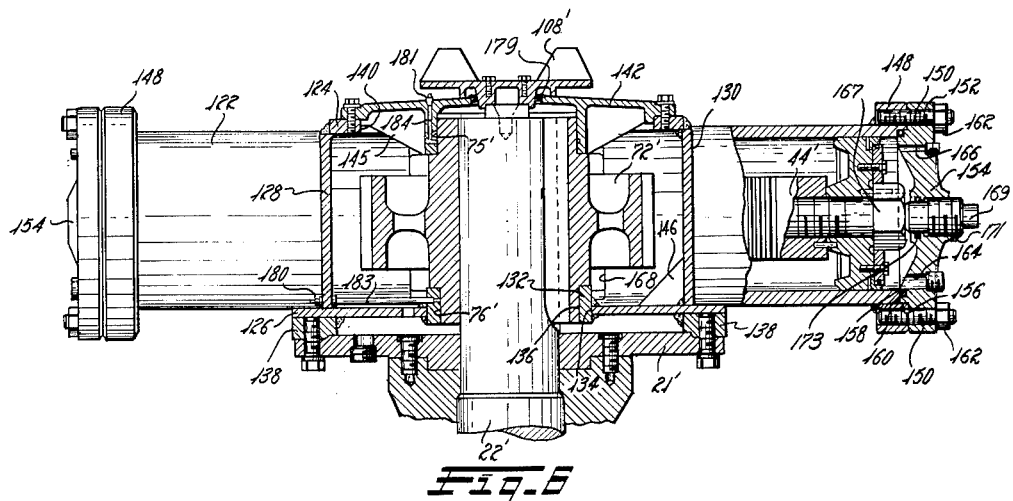
INVENTORS
EDMUND E. MATHESON
ADOLPH WOLFENSPERGER
BY
ATTORNEY Oct. 2, 1962    E. E. MATHESON ETAL    3,056,573
FLUID PRESSURE ACTUATED VALVE
Filed July 12, 1956    5 Sheets-Sheet 5
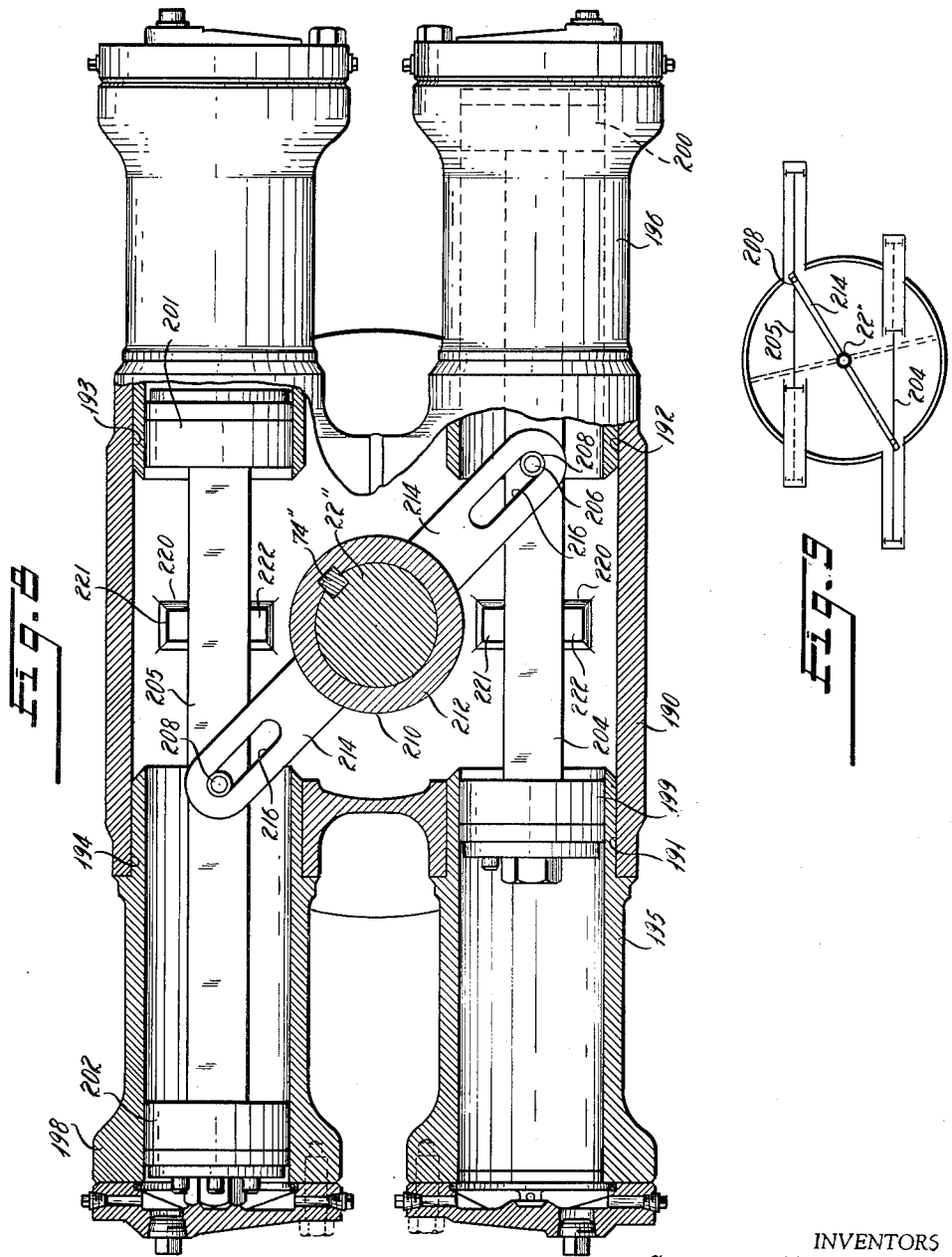
INVENTORS
*Edmund E. Matheson*
*Adolph Wolfensperger*
BY *Strauch, Nolan & Neale*
ATTORNEYS

United States Patent Office 3,056,573
Patented Oct. 2, 1962

3,056,573
FLUID PRESSURE ACTUATED VALVE
Edmund E. Matheson, Oakland, Calif., and Adolph Wolfensperger, Pittsburgh, Pa., assignors to Rockwell Manufacturing Company, Pittsburgh, Pa., a corporation of Pennsylvania
Filed July 12, 1956, Ser. No. 597,489
18 Claims. (Cl. 251—31)

This invention relates to fluid pressure actuated valves and more particularly, although not exclusively, to balanced fluid pressure motor operators for opening and closing valves having rotatable tapered, cylindrical, ball and like plugs.

Several important factors, including internal stresses and sealing, must be considered in relation to the powered opening and closing of plug type valves in which the operator usually is connected directly to the plug actuating stem. Such plug valves used in high pressure systems reach considerable size and as line pressures and sizes increase, a very tight seating engagement between the valve plug and seat occurs and great pains are taken to assure proper seating and sealing cooperation between the plug and the valve casing and between the plug stem and the casing. Plug valves, prior to this invention, have used double acting fluid motor operators with a single gear rack engaging a spur gear secured to the rotatable plug stem. In such a single rack system, coaction between the gear rack teeth and the spur gear teeth creates two components of side thrust normal to the axis of the valve stem which results in bending stresses being set up in the stem. One component of side thrust is due to resistance of the tightly seated plug to turning when a single torque force is applied to the plug stem, and the other is due to gear teeth reaction under load which, in a rack and pinion set, reacts substantially perpendicular to the rack. Such bending stresses tend to cause an effective or even an actual canting of the plug in its casing resulting in side pressure on the stem seal and the plug seating surfaces creating a binding action which in turn increases drag and causes uneven wear on the stem seal and the plug and casing seating surfaces. These pressures and drag forces necessitate increased operating torque to rotate the plug. Furthermore such bending stresses and uneven wear have detrimental effects on the plug stem and seals and greatly accelerate valve failure.

To eliminate the detrimental bending stresses and provide a compact power operator, this invention utilizes two parallel piston rods powered by four single-acting reciprocable piston servo-motors. In its preferred embodiment wherein the two piston rods are formed as racks, one on each side of the valve stem and both enmeshed with a single gear fastened to the plug stem, a balanced torque couple is obtained, opposed side thrusts created between diametrally opposite racks and the valve stem gear will be balanced, and hence no resultant bending stresses can be transferred to the plug stem. Two oppositely disposed single acting piston servo-motors are used to reversibly move each gear rack, one motor being provided at each end of the rack. In this double pairing arrangement, with fluid pressure applied only to the outer surface of each single acting piston, it is not necessary to provide long piston rods with high pressure seal means for sealing that rod as would be necessary with a servo-motor using one double acting piston. This invention, by using two single acting servo-motors, eliminates the need for a long piston rod with a special seal and enables the actuating gear racks to be directly connected to the servo-motor pistons. No serious problem will arise should operating fluid leak past the pistons from the pressure ends of the servo-motor cylinders since such fluid can pass into the common central chamber of the operator housing to be returned to the control system fluid reservoir or return line in a conventional manner. The operator of the invention has further advantages in reduction of the size of individual pistons, reduction in the size and length of the motor system since an elongated piston rod is not needed and a reduction in the total offset overhang of prior used operator and operating linkage arrangements, together with balanced bending stresses on the valve stem.

The previously mentioned side force created between the teeth of the gear rack and valve stem gear tends to move the rack away from engagement with the valve stem gear as well as placing a bending stress on the valve stem. To counteract this side force on the rack, rack and pinion installations used in general application, such as that shown in United States Patent No. 1,843,347 to Steelsmith, utilize various types of slidably adjustable rack guides to support the rack in its reciprocation and to absorb transverse forces that can deform the rack and possibly force it out of engagement with the mating pinion gear. In the present invention, a novel eccentrically mounted adjustable guide is used to back up each of the opposed racks in the operator installation. Each guide is pivotally mounted on an eccentric section of an adjusting arbor at least one end of which is accessible from the exterior of the power operator casing to enable adjustment of the guide for obtaining proper lateral bearing load during rack reciprocation, to maintain proper servo piston alignment without uneven side wall pressures and to adjust for wear of the guide and rack surfaces occasioned by operation of the racks over a long period.

A second embodiment utilizes pins or rollers on the two opposed piston rods, cooperating with slots in a plug operating lever. This embodiment also has a balanced torque couple and integral cylinder housing and by offsetting the cylinders a variable torque actuating force can be realized.

Accordingly a primary object of this invention resides in the provision of novel fluid pressure operated plug valve operating mechanism.

Another object resides in the provision of a novel plug valve and operator combination where operating forces between the operator and plug valve actuating stem are so balanced to effectively eliminate bending stresses in the valve stem.

A further object resides in the provision of two sets of opposed single acting servo-motor pistons with gear rack assemblies disposed on opposite sides of a gear on a plug valve actuating stem, for operating the valve plug without imparting bending stresses to the valve stem.

Another object resides in providing a novel four cylinder balanced valve operator with all cylinders integrally combined in a unitary housing separably mounted on a valve body.

A still further object resides in the provision of a novel balanced rack and pinion actuator assembly operated by two opposed single acting fluid servo-motors.

A still further object resides in the provision of novel sealing means between the cylinder head and cylinder of a fluid operated piston type servo-motor.

Still another object resides in the provision of novel adjustable guide means for the reciprocable rack in a rack and pinion mechanism.

A further object resides in a novel balanced valve operator with valve plug actuating linkage so arranged to provide a variable plug actuating torque from plug open to plug closed position.

Further novel features and objects of this invention will become apparent from the following detailed description and the appended claims taken in conjunction with the accompanying drawings showing a preferred embodiment thereof, in which:

FIGURE 1 is a side elevation, partially broken and sectioned, showing a valve operator, with four single acting fluid servo-motors, constructed according to the preferred embodiment of this invention and interconnected with plug type valve actuating stem;

FIGURE 2 is a top plan view, partially broken and sectioned, showing details of the valve operator of FIGURE 1;

FIGURE 3 is an enlarged detailed section taken on line 3—3 of FIGURE 2 illustrating the adjustable rack guide of this invention;

FIGURE 4 is a diagrammatic illustration of a simplified hydraulic control system which can be used to reversibly control the operator of this invention to position the valve in its open or closed condition;

FIGURE 5 is a top plan view of a modified embodiment of the power operator;

FIGURE 6 is an enlarged section view taken on line 6—6 of FIGURE 5 showing valve stem mounting details;

FIGURE 7 is an enlarged partial section taken on line 7—7 of FIGURE 5;

FIGURE 8 is a top plan view, partially broken and sectioned, similar to FIGURE 2, illustrating another embodiment with rollers and slotted levers for transmitting the valve actuating torque; and FIGURE 9 is a diagrammatic view illustrating how the embodiment of FIGURE 8 can be arranged with offset cylinders to obtain varied opening and closing torque.

With reference to FIGURE 1 the unitary valve operator 20 is disclosed as mounted on an adapter casting 21 fixed to the head of a valve casing (not shown) and disposed around the projecting rotatable valve actuating stem 22.

In the embodiment of FIGURES 1, 2 and 3 operator 20 is assembled on a hollow integral cast housing 23 having four end openings 24, 25, 26 and 27. These housing openings are arranged in pairs, with openings 24 and 25 in axial alignment on one side of the valve stem 22, and openings 26 and 27 in axial alignment, parallel to and diametrally oppositely spaced from aligned openings 24 and 25. Housing 23 is secured to the top of the adapter casting 21 by bolts 28. Four cylinders 29, 30, 31 and 32, are mounted rigidly in respective openings 24, 25, 26 and 27 and secured in position as by welding at 25.

With particular reference to cylinder 29, a piston 33 is reciprocally mounted within the cylinder bore, and the outer end of the cylinder is closed by an end closure plate or cylinder head 34 secured to the cylinder as by circumferentially spaced bolts 36. A fluid passage 38 is provided through the cylinder head 34 to the interior of the cylinder and provides means for connection in a suitable fluid pressure control circuit such as that illustrated in FIGURE 4. The inner face of cylinder head 34 is centrally recessed at 39 and includes a short projected boss 40 serving as a piston stop abutment. At the seating surface of cylinder head 34 a recessed annular seat 41 receives an O-ring 42 to seal the union between the head 34 and the end of cylinder 29. A plurality of auxiliary passages closed by plugs 43 are formed in the peripheral part of the cylinder head 34 and provide for drainage or various control system functions not part of this invention. Each of the remaining cylinders 30, 31, and 32 have similar pistons and end closure members.

Two identical parallel gear racks 44 and 45 are disposed one on either side of valve stem 22. As the racks and their piston connections are identical, only one rack and its connection to one piston will be described. The rack 44 has a cylindrical extension 46 provided on each end, one extension 46 projecting through a central bore 47 in piston member 33 with a shoulder 48, formed where the extension 46 joins the central body of the rack 44, abutting the back face of the piston. A nut 50 fastened to the threaded end of extension 46, securely holds the piston 33 on the rack against shoulder 48 and coacts with head boss 40 to delineate the limit of piston travel. An annular counterbored recess 52 is provided in the back face of piston 33 and receives an O-ring 53 to act against shoulder 48 and seal the piston bore 47, while an annular peripheral shoulder 54 on the front working face of the piston receives an operating pressure sealing gland 55 and retaining ring 56 secured by screws 57 to the face of the piston.

The cylinders 30, 31 and 32 are provided with respective pistons 58, 60 and 62 similar to piston 33. The right end of rack 44 is rigidly secured to the piston 58 in the same manner as its left end is secured to piston 33 and similarly the other rack 45 has its opposite ends secured to pistons 60 and 62, thereby connecting the pistons 33 and 58 as one set and pistons 60 and 62 as a second set of opposed single acting pistons.

The valve stem 22 (which may or may not be integral with the valve plug) projects upwardly from the valve plug through a pilot bore 66 formed in a boss 68 integral with the bottom wall of the housing 23 to a position centrally located between the two pairs of openings 24 and 25, and 26 and 27. Within the housing 23, a pinion gear 72 with integral sleeve 73 is drivingly fixed to the stem 22 by a key 74, fitted to permit relative axial movement between the gear 72 and stem 22. Each end of the gear sleeve 73 is reduced in diameter to provide annular journals 75 and 76 with shoulders 77 and 78. Lower sleeve journal 76 is rotatably disposed in the bottom wall pilot bore 66 and axially positioned by engagement of shoulder 78 with the pilot bore boss 68 on the bottom wall of housing 23. The top wall of the operator housing 23 has a large central opening 79, of sufficient diameter to permit installation of gear 72, covered by a cap member 80 which includes an apertured boss 81 fitting around the upper gear sleeve journal 75 and extending to adjacent the sleeve shoulder 77, leaving a small running clearance. Cap member 80 is fastened to housing 23 by screws 82 and with the pilot bore boss 68 journals the gear 72 in axially fixed relationship to the housing. With gear 72 fixedly journalled in the operator housing, the operator may be assembled or removed from the adaptor 21 as a unit.

As shown in FIGURE 2, the gear 72 meshes with both of the gear racks 44 and 45 at diametrally opposite sides of the gear and valve stem axis. As racks 44 and 45 are power shifted in opposite reciprocable paths a balanced torque couple will be applied through gear 72 to the valve stem 22 with no resultant bending stress in the stem due to the applied torque. Also the side forces on gear 72, resulting from transfer of power between the rack and gear teeth, at one side of the stem will be balanced by an equal and opposite side force on the gear 72, resulting from transfer of power between the rack and gear teeth, at the other side of the stem.

At each side of the power operator housing 23 and adjacent the back surface of each rack 44 and 45 an arbor 85 extends parallel to the gear axis and is journalled in the top and bottom walls of the housing 23. A rack guide member 86 is journalled within housing 23 on a cylindrical eccentric section 87 of the arbor 85, and is restrained against axial movement relative to the arbor by a boss 88 projecting up from the bottom wall of the housing 23 and a shoulder 89 formed on arbor 85 above the eccentric section 87. Just above shoulder 89 an annular groove 90 in arbor 85 cooperates with a lock screw 91 threaded in housing 23 to thereby axially position and lock the arbor 85 relative to housing 23. The guide member 86 has a flat bearing surface 92 which is positioned to slidably bear against the back surface of the gear rack 44. Arbor 85 can be rotated, after loosening lock screw 91, relative to the housing 23 by a spanner wrench fitted in sockets 93 provided in the upper end of the shaft and such rotation will result in eccentric adjustment of the guide 86, i.e., rotation of the eccentric section 87 of the arbor 85 will move the guide 86 toward or away from the center of the operator housing to enable the desired degree of abutment with the back of rack 44. When the correct guiding relation between guide 86 and the back surface of rack 44 is obtained, the adjusting arbor 85 is locked by tightening the screw 91. A similar adjusting arbor and guide member are provided for rack 45.

A schematic diagram of a control circuit is illustrated in FIGURE 4. When it is desired to turn the valve stem 22 in a counterclockwise direction, as viewed in FIGURE 2, hydraulic pressure is admitted from a common line 94 to the outer end of cylinders 29 and 31 through the fittings 95 and 96 fastened in the fluid passages 38 provided in cylinder head members 34. When fluid is admitted to cylinders 29 and 31, opposite cylinders 30 and 32 of each set are exhausted through fittings 97 and 98 to a common line 99 which, through a control valve 100 is connected to the return line of a hydraulic pressure supply source (not shown). The pistons 33 and 58 with their connected rack 44 are thus moved to the right while pistons 60 and 62 with their connected rack 45 are moved to the left. Racks 44 and 45, being meshed with pinion gear 72, apply a balanced torque couple to turn gear 72 counterclockwise, turning the valve stem 22 in the same direction. When it is desired to turn the valve stem 22 clockwise, the control valve 100 is operated to reverse the connections from supply and return to apply fluid under pressure to the outer end of cylinders 30 and 32 and exhausting the outer end of cylinders 29 and 31. This will move pistons 33 and 58 with rack 44 to the left and pistons 60 and 62 with rack 45 to the right, effecting a clockwise rotation of the gear 72 and stem 22.

Since the servo-motor pistons of this power operator are single acting, they are subject to fluid pressure on only one side and leakage of operating fluid past the piston seal gland 55 will pass into and collect in the space 102 at the bottom of housing 23. To remove collected fluid, a passage 103 is provided in the housing wall and a drain line 104 connected between passage 103 and the return line of the control system.

An indicator 108 is rigidly secured to the end of valve stem 22 through cooperation with the key 74 and a screw 109 threaded into the stem end. The indicator body has a horizontal portion 110 that covers and is spaced a slight distance above aperture 83 in the cap member 80. An annular flange 112 depends from the indicator horizontal portion 110 and surrounds and overlaps an upstanding annular flange 114 on the cap member 80 to form a dirt and dust shield around the cap aperture. A dust seal 115 may be provided in cap aperture 83 if desired. Projecting upward from the top of horizontal portion 110 are two diametral lugs 116 serving to indicate the open or closed position of the valve plug. The lugs 116, engaged by a suitable wrench, can be used as an auxiliary valve operator if pressure in all four cylinders is relieved.

Separate bearing sleeves may be furnished for the various journals if desired. Lubricant fittings, such as illustrated in the embodiment of FIGURES 5, 6 and 7 can be used for proper lubrication of the moving parts in the embodiment of FIGURES 1, 2 and 3. Note the power operator 20 can be removed as a unit by removing screw 109, indicator 108 and bolts 28, and lifting the operator vertically so gear 72 slides axially along key 74.

With respect to FIGURES 5, 6 and 7 one modified form of this invention is disclosed. For most smaller valve sizes, the cast operator body with inset cylinders, as illustrated in the first embodiment are commercially feasible from both manufacturing and cost aspects. However, in larger size valves, e.g. the 30" sphere or ball valves used in 30" lines, the operator required must be large and both cost and manufacturing considerations warrant the use of a built-up welded steel plate operator. Accordingly the second operator embodiment is contemplated for larger size valves although not restricted thereto.

FIGURE 5 illustrates two sets of servo-motor cylinders 120 and 122, each integrally formed from a rolled sheet steel tube. A top plate 124 and a bottom plate 126 are welded respectively to the top and bottom cylinders 120 and 122. Side plates 128 and 130, with their edges cut to closely engage the cylinders 120 and 122 are placed between and welded to the top and bottom plates 124 and 126 and also welded to the cylinders, to form the built up hollow operator body. A short annular sleeve 132 is welded in a central aperture 134 in bottom plate 126 to provide a pilot bore 136 for journalling the lower end of pinion gear 72'. A ring 138 welded to the bottom side of bottom plate 126 provides a mounting flange to be fastened to a valve adaptor casting 21'. Upper plate 124 has a large aperture 140, to permit insertion of gear 72', which is covered by cover member 142. Structural reinforcing ribs 145 and 146 may be welded to the body plates and cover member 142 as required.

Welded around the periphery of each cylinder 120 and 122 at both ends are rings 148 forming cylinder head mounting flanges. Threaded studs 150 are circumferentially spaced in flange rings 148 and pass through corresponding apertures 152 in cylinder head closure members 154. Each cylinder head 154 has a double stepped annular seat 156 that pilots the head on the inner surface of the cylinder and cooperates with an annular shouldered recess 158 in the end edge of the cylinder to tightly retain a seal ring 160 between the head and cylinder when nuts 162 are secured on studs 150. A fluid passage 164 and auxiliary passage 166 are incorporated in each head member for fluid control connections.

Disposed in each of cylinders 120 and 122 are opposed piston sets directly connected to respective gear racks by bolts 167, the sets being substantially similar to the corresponding sets in the first embodiment. To accurately adjust the piston assembly stroke, a stop 169 is screw threaded in the cylinder head 154 in alignment with the head of bolt 167. After adjustment has been made for the correct piston stroke, each stop 169 is tack welded as at 171 to its respective head. An O-ring 173 provides a seal between stop 169 and cylinder head 154.

The central part of each cylinder 120, 122 facing the interior of the operator body, has been cut away at 168 to enable insertion, removal and meshed engagement of the pinion gear 72' relative to the racks 44' and 45'. The outer central part of each cylinder is cut away at 169 to receive rack guide assemblies 170 which are inset and welded to the cylinders. Each guide assembly 170 includes a rolled plate shell 172 open at the inner side to permit guiding cooperation between the back face of gear racks 44' and 45' and a roller guide member 86', which is mounted by needle bearings on an eccentric section 87' of an arbor 85'. The arbor 85' and eccentric mounting section 87' are substantially identical to those in the first embodiment, however, instead of being journalled in the top and bottom housing walls, apertured plugs 174 and 176 are welded in the top and bottom openings of shell members 172 and journal the opposite ends of arbor 85'. Guide assemblies 170 with roller members 86' cooperate with the gear racks 44' and 45' through a rolling line contact rather than a plane area contact as in the first embodiment. Adjustment to obtain good solid contact between the rack 44' and roller member 86' is obtained by the eccentricity of section 87' of arbor 85'. A locking screw 91' together with a lock nut 178 cooperate with the upper end of the guide shell 172 and the groove in arbor 85' to rotatably and axially lock the arbor 85' after adjustment.

The stem position indicator 108' in this embodiment is arranged on the valve stem relative to the cap member 142 with spring-loaded dust seal 179, in a manner similar to that of FIGURE 1 but, due to the high torques required to turn large size valve plugs, is not intended to be used as an auxiliary actuator.

Various lubricant fittings 180, 181 and 182 with associated passages 183, 184 and 185 provide means to lubricate the two gear sleeve journals 75' and 76' and the eccentrically journalled guide member 86'.

FIGURES 8 and 9 illustrate a further embodiment of the balanced torque, valve operator with an integral housing 190 having four end openings 191, 192, 193 and 194 and four cylinders 195, 196, 197 and 198 mounted rigidly in respective openings. Pistons 199, 200, 201 and 202 are disposed in the respective cylinders. Except for some differences in the housing structure, the housing, cylinders and pistons of this embodiment are essentially similar to the corresponding elements as described in the embodiment of FIGURES 1 and 2, and will not be described again in detail.

Piston rods 204 and 205 are disposed one on either side of valve stem 22", and are connected at each end to a piston in the manner previously described for racks 44 and 45. Each piston rod 204 and 205 has an upstanding pin 206, rigidly fixed at a position midway between the two connected pistons and journalling a roller 208. A lever 210 having an integral central sleeve-shaped collar 212 and diametral lever arms 214 is drivingly fixed to the valve stem 22" by a key 74". Lever collar 212 may be formed with ends substantially as shown on gear sleeve 73 in FIGURE 1, for structural cooperation with the housing 190 and a cap member. Each lever arm 214 is formed with slotted openings 216 fitting over the roller 208 on a respective piston rod 205.

Reciprocation of the opposed sets of pistons, through coaction of the rollers 208 and slotted lever arms 214, will rotate the valve plug between open and closed positions. Because of the reversal of reaction force on the roller 208 due to the changing inclination of arm slot 216 when the valve plug is rotated 90°, piston rods 204 must absorb side forces directed both toward and away from the valve stem. Two bosses 220, are formed integral with the lower wall of housing 190 and have upstanding inner and outer lugs 221 and 222 with side faces abutting the sides of piston rods 204 and 205 in guiding relation and substantially absorb such side thrusts transferred from the levers 214 to rollers 208. Guide lugs 221 and 222 thus prevent high undesirable side loads from being transmitted to the piston and cylinder assembly and thereby tend to decrease side wear on the pistons or cylinders.

The roller and slotted lever embodiment of FIGURE 8 may be further modified, as diagrammatically indicated in FIGURE 9, by offsetting the opposed pairs of cylinders. As illustrated, this arrangement provides a higher torque application to the valve stem when turning the valve in a counterclockwise direction than in a clockwise direction because of the greater mechanical advantage afforded between the roller 208 and inclined slotted lever arm 214 when positioned as shown in heavy lines. When the operator is positioned as shown in phantom lines the connection between roller and lever is substantially at its lowest mechanical advantage value. This variable torque application on a valve stem is particularly advantageous in plug valve operation where very high forces are often required in opening the valve plug because of high line pressures acting to tightly seat the plug. Such tight seating is not normally present when initiating closing movement of plug valves hence the same high opening torque is not required.

In each of the aforedescribed modifications, provision is made for relative axial movement between the valve stem 22, 22' or 22" and the operator body and pinion gear 72 or 72' or lever 210. Note that indicator 108 is so disposed as to permit axial shifting relative to the cap member 80 or 142. Such means for relative axial movement must be provided when the power operator is used with valves having threaded stems or with stem integral with axially jackable tapered plug valves. When the operator is used with an axially fixed threadless valve actuator there will be no relative axial movement between the stem and pinion gear or lever.

From the foregoing description, there is hereby provided a novel multi-piston servo-motor power operator for operating valves having an actuating stem rotatable through a limited arc of approximately 90 degrees between fully open and fully closed positions. The preferred arrangement of two sets of opposed single acting pistons and gear racks provides a powerful valve stem turning torque couple without the inherent bending stresses applied to the valve stem by single point torque application, and without resultant side thrust due to gear teeth reaction in a single rack and pinion installation. Elimination of such bending stresses increases the operating life of valve seats, plugs, stems and stem seals, and allows use of a smaller plug stem. The use of four single acting servo-motor pistons in lieu of one or even two double acting single piston servo-motors makes the operator more compact and eliminates the necessity of a shaft to cylinder seal and packing. The new eccentric type adjustable gear rack guide provides a rapid and positive back up bearing abutment member that can be adjusted to absorb side thrusts in the rack, prevent uneven wear of the servo-motor piston and cylinders and maintain correct meshing engagement of the rack and pinion gear teeth.

Although the preferred embodiment of this invention is illustrated and described as including four single acting servo-motors the means for eliminating unbalanced operating forces on the valve stem to obtain the highly desirable increase in element life, this can be accomplished with two double acting single piston servo-motor operated gear racks on diametral sides of a pinion fastened to a valve stem. Hence such structure is contemplated within the broader aspects of this invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. For use in combination with a plug valve wherein a valve plug is rotatably mounted in a valve body and a valve actuating stem projects from the plug through the body, a motor adapted to actuate the valve actuating stem comprising: four operating cylinders disposed in two sets, each set comprising a single tube with opposite ends providing two aligned spaced apart cylinders and each tube being spaced apart and disposed in parallel arrangement; support means rigidly secured to each tube and adapted to be fastened to a valve body; a gear rack connecting the two pistons in each set of aligned cylinders; a pinion gear rotatably mounted within said support means, adapted to drivingly engage a plug valve actuating stem and meshed with said gear racks through diametrally disposed pinion gear teeth; end closures on said cylinders having passages therethrough adapted to be fitted with control conduits for motor operating fluid; and rack guide assemblies, each comprising a tubular shell with closures at each end, and an adjustable guide disposed therein, fixed in a central portion of said tubes in abutting relation with said racks for absorbing transverse thrust resulting from powered gear operation.

2. A valve assembly comprising: a casing; a rotatable valve element in said casing movable in a limited arc between an open and closed condition relative to said casing; a rotatable valve element actuating stem projecting from said casing; an operator disposed in fixed relation on said casing and providing a closed housing surrounding said stem, said operator comprising: a hollow body with opposed end walls, one of which end walls has an opening therethrough, through which said stem projects; a rotatable member within said body; means on said opposed end walls engaging and rotatably journalling said rotatable member substantially coaxial with said opening; means within said rotatable member accessible through said opening for concentrically non-rotatably coupling said rotatable member to said valve element actuating stem; and two elongate reversible motor driven assemblies in driving engagement with diametrically opposite sides of said rotatable member at locations within said body to provide a balanced torque couple on said rotatable member for turning it and said stem through an arc.

3. A servo-motor set comprising: two aligned cylinders; structure rigidly joining said aligned cylinders discontinuous at least on one side; a cylinder end closure fastened to the divergent end of each cylinder including an annular recess on its inner surface; an O-ring disposed in said recess in each end closure and retained between said end of each cylinder and the end closure; a piston having a central aperture disposed in each cylinder; a gear rack, having reduced end portions, extending between said pistons with said reduced portions projected through said aperture and with the gear teeth facing the discontinuous side of said structure; a coaxial counterbore on the non-working face of said pistons; a seal ring disposed in said counterbore; means fastened to the ends of said reduced rack portions securing said pistons on the ends of said racks; a sealing gland disposed around the periphery of the working face of each of said pistons; and means maintaining said sealing ring against said piston.

4. A servo-motor set comprising an integral sheet metal tube including two aligned cylinders, said sheet metal tube between said aligned cylinders being discontinuous at least on one side; a ring flange fixed to said tube adjacent each end; a cylinder closure member fastened to each ring flange including an annular seal retaining groove on its inner surface; an O-ring disposed in said groove retained between the end surface of each cylinder and the cylinder closure member thereby providing a tight seal between each closure member and its corresponding cylinder; a piston having a coaxial bore disposed in each cylinder; a gear rack having reduced end portions extending between said pistons with said reduced portions projected through said bore and with the gear teeth facing said discontinuous side of said tube; a coaxial counterbore on the non-working face of said pistons, a seal ring disposed in said counterbore; means fastened to the ends of said reduced rack portions securing said pistons on the ends of said racks; a seal assembly disposed around the periphery of the working face of each of said pistons; and means maintaining said sealing ring against said piston.

5. In a plug valve assembly, a valve body, a ported plug rotatably mounted in said valve body for movement through a predetermined arc between open and closed positions; a stem for said valve body projecting externally of said valve body, and power operator means for rotating said valve plug with balanced torque between open and closed positions comprising: a hollow housing with opposed end walls, one of which end walls has an opening therethrough; means rigidly mounting said housing on said valve body so that said stem projects through said end wall opening; a rotatable member within said body; means on said opposed end walls engaging and rotatably journalling said rotatable member substantially coaxial with said opening; means within said rotatable member accessible through said opening for concentrically non-rotatably coupling said rotatable member to said stem; and two elongate reversible motor driven assemblies in driving engagement with diametrically opposite sides of said rotatable member at locations within said body to provide a balanced torque couple on said rotatable member for turning it through an arc.

6. In the plug valve assembly defined in claim 5, said rotatable member being a double armed member having its arms extending oppositely into slide pivot connections with said reciprocable members.

7. In the plug valve assembly defined in claim 5, said rotatable member being a gear and said two motor driven assemblies comprise parallel reciprocable members having rack teeth meshed with said gear on opposite sides thereof.

8. A plug valve assembly comprising: a rotatable plug valve including a casing and a plug with a plug operating stem projecting from said casing; a removably secured plug actuator on said casing including a housing structure having a mounting portion disposed over said projected stem, secured to and in effective sealed abutment with said casing around said stem, means on said structure providing a base wall surrounding said stem, side walls and a cover means, said base wall and said cover means constituting opposed spaced apart walls providing spaced apart aligned journal means substantially coaxial with said stem, a gear with an axial through bore receiving said stem, said gear having spaced pilot portions journalled for rotation in axially fixed disposition in said journal means, means non-rotatably coupling said gear to said plug operating stem, and two parallel reversible motor-rack sets secured in said side walls with said racks meshed with said gear on diametrally opposite sides, to provide a balanced torque couple on said gear for turning it and said stem through an arc, each of said motor-rack sets comprising a rack with a single acting reciprocating motor on each end thereof.

9. An operator comprising: a hollow body with opposed end walls, one of which end walls has an opening therethrough; a rotatable member within said body; means on said opposed end walls engaging and rotatably journalling said rotatable member substantially coaxial with said opening; two elongate reversible motor driven assemblies in driving engagement with diametrically opposite sides of said rotatable member at locations within said body to provide a balanced torque couple on said rotatable member for turning it through an arc; and means within said member accessible through said opening for concentrically coupling said rotatable member to a rotatable device.

10. An operator as defined in claim 9 wherein said one of said body end walls is a base wall and the other end wall is a removable cover, the means on said opposed end walls are spaced apart and constitute coaxially aligned rotational bearing means, and said rotatable member has a through bore and spaced apart pilot end portions coaxial with said through bore and journalled for axially fixed disposition in said bearing means.

11. A torque converter for converting linear to rotary motion comprising a housing having first and second spaced parallel piston chambers, the housing also having a gear chamber interposed between the piston chambers, said chambers being interconnected, a gear in said gear chamber, said housing comprising means mounting said gear axially fixed and rotatably journalled in said gear chamber, a first piston means carried in the first chamber, a second piston means carried in the second chamber, said piston chambers and piston means each having first and second ends, said piston means each having a rack formed intermediate the first and second ends, the racks each being in engagement with the gear, said converter having first and second fluid passages, said first fluid passage being connected to said first piston chamber first end and said second piston chamber second end, said second fluid passage being connected to said first piston chamber second end and said second piston chamber first end, said piston chambers each having a smooth surface, seals carried by each of the piston means at their first and second ends, the seals each being in slidable engagement with one of the piston chamber surfaces, and caps to close the ends of the piston chambers, said gear chamber and said first and second piston chambers intermediate said seals forming a lubricant reservoir, whereby to provide a device in which fluid under pressure introduced through the first fluid passage will drive the first piston means toward the first piston chamber second end and simultaneously drive the second piston means toward the second piston chamber first end to cause the racks to drive the gear rotatively in one direction with an equal torque load application by each of the racks on opposite sides of the gear, and whereby to provide a device in which fluid under pressure introduced through the second fluid passage will cause the piston means and the gear to move in the opposite direction under balanced torque conditions.

12. In a rack and pinion gear set: a rack, a pinion meshed with said rack; a support mounting said rack for linear reciprocation; rack guide means comprising a member fixed relative to said support, an arbor journalled in said fixed member including an eccentric cylindrical section, and means rotatably mounted on said eccentric section comprising an apertured block disposed with said eccentric section passing through and journalled in said aperture and having a flat bearing surface adapted to slidably engage the back side of said rack in a surface to surface contact to absorb side thrusts created by coaction between the rack and pinion teeth.

13. An operator as defined in claim 9 wherein, said rotatable means is a pinion gear, and said two motor driven assemblies include parallel reciprocable racks meshed with said gear on opposite sides of said gear.

14. An operator as defined in claim 9, wherein said rotatable member comprises: a double arm lever and said motor driven assemblies comprise two sets of opposed reciprocable servomotors, each set having aligned reciprocable power members and an elongate means disposed at least in part within said body connecting said power members and means carried by said elongate means coupling with one arm of said lever.

15. An operator as defined in claim 9, wherein said two motor driven assemblies comprise two sets of reversely reciprocable servo-motors, each set having a rod and attached roller reciprocable thereby, and said rotatable member comprises a lever with diametrically opposed slotted arms, each slotted arm receives one of said rollers whereby said lever is coupled with both of said rods and rollers so that reciprocation of both sets of servo-motors in opposite directions will provide limited rotation of said lever.

16. An operator as defined in claim 15, wherein said two sets of reciprocable servo-motors are offset, along axes coextensive with their axes of reciprocation, equal distances in opposite directions so one servo-motor of each of said sets of servo-motors is closer to the axis of rotation of said lever than is the other servo-motor of each of said sets of servo-motors.

17. An operator as defined in claim 9, said rotatable member being a double armed member having its arms extending diametrically, and means to provide slide pivot connections between said arms and said motor driven assemblies.

18. An operator as defined in claim 9, wherein said hollow body comprises: a base wall, side walls and a cover means, and said base wall and said cover means constitute said opposed end walls and include spaced apart aligned journal means; said rotatable member comprises a gear having spaced pilot portions journalled for rotation in axially fixed disposition in said journal means; and said motor driven assemblies comprise two parallel reversible motor-rack sets secured in said side walls with said racks meshed with said gear on diametrally opposite sides, each of said motor-rack sets comprising a rack and a reciprocating motor on each end of said rack.

References Cited in the file of this patent

UNITED STATES PATENTS

| | | |
|---|---|---|
| 616,211 | Taylor | Dec. 20, 1898 |
| 719,562 | Brush | Feb. 3, 1903 |
| 1,385,289 | Ward | July 19, 1921 |
| 1,460,785 | Buckley | July 3, 1923 |
| 1,516,000 | Clark | Nov. 18, 1924 |
| 1,622,780 | Goodline | Mar. 29, 1927 |
| 1,726,621 | Hart | Sept. 3, 1929 |
| 1,843,347 | Steelsmith | Feb. 2, 1932 |
| 2,085,688 | Schuchman | June 29, 1937 |
| 2,149,725 | Canariis | Mar. 7, 1939 |
| 2,152,651 | Kinzie | Apr. 4, 1939 |
| 2,185,277 | Stelzer | Jan. 2, 1940 |
| 2,433,990 | Hardy | Jan. 6, 1948 |
| 2,491,375 | Hardy | Dec. 13, 1949 |
| 2,509,161 | Meyers | May 23, 1950 |
| 2,643,677 | MacLean | June 30, 1953 |
| 2,681,581 | Pearson | June 22, 1954 |
| 2,751,183 | Crookston | June 19, 1956 |
| 2,780,432 | Shafer | Feb. 5, 1957 |
| 2,823,888 | Wynn | Feb. 18, 1958 |
| 2,844,127 | Steiner | July 22, 1958 |

FOREIGN PATENTS

| | | |
|---|---|---|
| 508,735 | Germany | of 1930 |
| 416,019 | Great Britain | of 1934 |
| 418,434 | Great Britain | of 1934 |
| 1,104,952 | France | of 1955 |